US007702571B2

(12) United States Patent  
 Janowski et al.

(10) Patent No.: US 7,702,571 B2  
(45) Date of Patent: Apr. 20, 2010

(54) METHOD FOR DISPLAYING INFORMATION FOR USE IN ELECTRONIC TRADING OF FINANCIAL INSTRUMENTS

(75) Inventors: Braden Shayne Janowski, Tulsa, OK (US); Grigoriy Ginzburg, London (GB)

(73) Assignee: TradeHelm, Inc., Tulsa, OK (US)

( * ) Notice: Subject to any disclaimer, the term of this patent is extended or adjusted under 35 U.S.C. 154(b) by 5 days.

(21) Appl. No.: 12/194,063

(22) Filed: Aug. 19, 2008

(65) Prior Publication Data

US 2008/0313098 A1 Dec. 18, 2008

Related U.S. Application Data

(62) Division of application No. 11/362,556, filed on Feb. 24, 2006.

(51) Int. Cl.
 *G06Q 40/00* (2006.01)

(52) U.S. Cl. ....................................... 705/37; 705/36 R

(58) Field of Classification Search .................. 705/14, 705/35, 36 R, 37, 39
See application file for complete search history.

(56) References Cited

U.S. PATENT DOCUMENTS

| | | | |
|---|---|---|---|
| 6,278,982 B1 | 8/2001 | Korhammer et al. | |
| 6,408,282 B1 | 6/2002 | Buist | |
| 6,766,304 B2 | 7/2004 | Kemp, II et al. | |
| 6,772,132 B1 * | 8/2004 | Kemp et al. | 705/36 R |
| 6,938,011 B1 | 8/2005 | Kemp, II et al. | |
| 6,993,504 B1 | 1/2006 | Friesen et al. | |
| 2002/0029180 A1 | 3/2002 | Kirwin et al. | |
| 2002/0099644 A1 | 7/2002 | Kemp, II et al. | |
| 2002/0188552 A1 | 12/2002 | Kavounas et al. | |
| 2003/0004853 A1 | 1/2003 | Ram et al. | |
| 2003/0041000 A1 * | 2/2003 | Zajac et al. | 705/37 |
| 2003/0200167 A1 | 10/2003 | Kemp, II et al. | |
| 2004/0068461 A1 | 4/2004 | Schluetter | |
| 2004/0093300 A1 | 5/2004 | Burns | |
| 2004/0103054 A1 | 5/2004 | Singer | |

(Continued)

FOREIGN PATENT DOCUMENTS

EP 1531414 A1 5/2005

(Continued)

OTHER PUBLICATIONS

Anonymous "Another Big Bug for Banks?" Jul. 1, 1998, Bank Technology News.*

(Continued)

*Primary Examiner*—Kelly Campen
(74) *Attorney, Agent, or Firm*—Michael E. Sellers

(57) ABSTRACT

Financial instruments may be electronically traded according to any of three modes, including single instrument mode, correlated mode, and aggregated mode. One of more market depth representations showing current market price levels, Bids and Asks of the financial instrument(s) to be traded are displayed on a GUI window. The user mouses parallel to the market depth representation to a price level at which the user wishes to initiate a trade, and the moused-over price level is selected and highlighted for all correlated market depth representations displayed on the GUI. All trade order parameters are pre-constructed either prior to selecting or upon selecting of a price level. The user then clicks a mouse button or initiates some other action of a user input device to place an order.

29 Claims, 9 Drawing Sheets

U.S. PATENT DOCUMENTS

| | | | |
|---|---|---|---|
| 2004/0143538 A1* | 7/2004 | Korhammer et al. | 705/37 |
| 2004/0153391 A1 | 8/2004 | Burns et al. | |
| 2004/0193524 A1 | 9/2004 | Almeida et al. | |
| 2004/0199450 A1 | 10/2004 | Johnston et al. | |
| 2004/0199452 A1 | 10/2004 | Johnston et al. | |
| 2004/0199459 A1 | 10/2004 | Johnston et al. | |
| 2004/0210514 A1 | 10/2004 | Kemp, II et al. | |
| 2004/0236662 A1 | 11/2004 | Korhammer et al. | |
| 2004/0236668 A1 | 11/2004 | Toffey | |
| 2005/0102217 A1 | 5/2005 | Burns et al. | |
| 2005/0125327 A1 | 6/2005 | Fishbain | |
| 2005/0125328 A1 | 6/2005 | Schluetter | |
| 2005/0144112 A1 | 6/2005 | Singer et al. | |
| 2005/0154668 A1 | 7/2005 | Burns et al. | |
| 2005/0192887 A1 | 9/2005 | Triplett | |
| 2005/0222936 A1 | 10/2005 | Panariti et al. | |
| 2005/0246263 A1 | 11/2005 | Ogg et al. | |
| 2006/0161495 A1* | 7/2006 | Wigzell | 705/37 |
| 2006/0173761 A1* | 8/2006 | Costakis | 705/35 |
| 2007/0076002 A1* | 4/2007 | Heaton | 345/440 |
| 2008/0097939 A1 | 4/2008 | Guyon et al. | |

FOREIGN PATENT DOCUMENTS

| | | | |
|---|---|---|---|
| JP | 2005100098 A | * | 4/2005 |
| WO | WO 95/26005 | | 9/1995 |
| WO | WO 00/65510 | | 11/2000 |
| WO | WO 01/16830 | | 3/2001 |
| WO | WO 01/16852 | | 3/2001 |
| WO | WO 01/22315 | | 3/2001 |
| WO | WO 01/88808 | | 11/2001 |
| WO | WO 02/27627 | | 4/2002 |
| WO | WO 2004/061729 | | 7/2004 |
| WO | WO 2005/076175 | | 8/2005 |
| WO | WO 2005/083603 | | 9/2005 |

OTHER PUBLICATIONS

Macrae, Desmond "Full Service Firms and the Internet: The Nightmare Continues-Their Heads Are No Longer in the Sand, but Senior Executives Still Lose Sleep Over How Far They Can Go With Online Brokerage" Dec. 1, 1998, on Wall Street, PP1.*

Johnson, R. Colin Era of Smart People is Dawning (Raymond Kurzweil Believes Humans Will Evolve Into Cyborgs With Neoral Implants) Dec. 28, 1998, Electronic Engineering Times, 62(1).*

Holter, James T. "Software Review (Modulus Financial Engineering's TA-SDK Trading Software)" Sep. 2002, Futures (Cedar Falls Iowa) 31,11,62(1).*

Friedlander, Josh "Algo Wars the Street is Pushing Algorithmic Trading With a Vengence-Perhaps Even Down Into Small Caps" May 30, 2005, Investment Dealers' Digest: IDD PP1.*

EP Search Report, Dec. 19, 2006, European Patent Office.

* cited by examiner

METHOD FOR DISPLAYING INFORMATION FOR USE IN ELECTRONIC TRADING OF FINANCIAL INSTRUMENTS

CLAIM OF PRIORITY

This application is a divisional of U.S. patent application Ser. No. 11362556 filed Feb. 24, 2006 entitled "Method And Apparatus For Electronic Trading Of Financial Instruments".

FIELD OF THE INVENTION

The present invention relates generally to electronic trading of financial instruments. More particularly, the present invention relates to an electronic trading methodology and apparatus that enhances the ability of a trader to view desired information and obtain a desired trading price.

BACKGROUND OF THE INVENTION

Electronic trading of financial instruments has been implemented on many exchanges around the world. Financial instruments that are commonly traded on electronic exchanges include stocks, bonds, commodities, futures, currency, and others. Trading of electronic instruments is a highly competitive activity and one that relies on speed in the making, processing and filling of orders. Electronic traders have a distinct advantage over traders who utilize other means of trading due to the increased speed by which an order can typically be made, processed and filled. However, among other electronic traders, this advantage is greatly diminished. Thus, there is an ever-increasing need to escalate functionality with the hardware and network resources available to modern traders.

At the electronic exchange, a centralized host computer provides the general functions of matching and maintaining orders and positions, maintaining price information, managing the daily online trading database, and conducting nightly batch runs. The host computer also interfaces with external networks to quote prices and to provide other information. Traders can link to the host through one of the external networks, either directly or through other servers or gateways. Regardless of how the link to the host computer is established, traders must use software designed to manage the electronic trading process. The software generates trading screens that enable the trader to obtain market quotes, submit orders, and monitor positions while various trading strategies, such as correlation group trading and price normalization, are employed.

As mentioned above, the success and profitability of electronic traders is highly dependent on speed, including speed in determining when to place an order and at what price, and the speed in which the order can be sent to the marketplace. Because of the importance of speed, it is desirable for electronic trading software and systems to offer features that can assist the trader in making trades as quickly as possible and at the best prices available. For example, it would be desirable to have an electronic trading system that displays information to the trader in an efficient format and in a way that enables the trader to quickly obtain needed information and submit trade orders with minimal user input. By improving the speed and efficiency in which information is made available and trade orders are submitted, the trader is able to recognize favorable trading conditions faster and place trade orders more quickly to improve the likelihood of getting those orders filled before market conditions change.

SUMMARY OF THE INVENTION

The present invention achieves its objectives by providing a method for displaying information for use in placing a trade order bundle having trade order parameters for one or more financial instruments to be traded on one or more electronic exchanges. In accordance with the method, a first real time market depth representation of one or more tradable financial instruments is displayed on the screen of a graphical user interface. The first real time market depth representation includes multiple price levels representing market prices for the one or more financial instruments represented by the first market depth representation. A second real time market depth representation of one or more tradable financial instruments is also displayed on the graphical user interface screen. The second real time market depth representation includes multiple price levels representing market prices for the one or more financial instruments represented by the second market depth representation. A market price level of the first market depth representation is selected through action of a user input device, and in response to this selection, an indicator of one or more correlated price levels is displayed on the second real time market depth representation.

In a further aspect of the method, the trade order bundle may be sent to the one or more electronic exchanges through further action of a user input device (such as a computer mouse with one or more buttons). For example, a buy order bundle may be sent by activating a first button on the mouse and a sell order bundle may be sent by activating a second button on the mouse.

All parameters of the trade order bundle may be pre-set prior to the user taking final action with the user input device to submit the trade order bundle to an electronic exchange. Alternatively, all parameters of the trade order bundle may be pre-set upon selection of the market price level.

In accordance with a further aspect of the method, an indicator of one or more correlated price levels may be displayed on the second real time market depth representation.

BRIEF DESCRIPTION OF THE DRAWINGS

Preferred embodiments of the invention will now be described in further detail. Other features, aspects, and advantages of the present invention will become better understood with regard to the following detailed description, appended claims, and accompanying drawings (which are not to scale) where:

DETAILED DESCRIPTION OF THE PREFERRED EMBODIMENT

Figure 1:
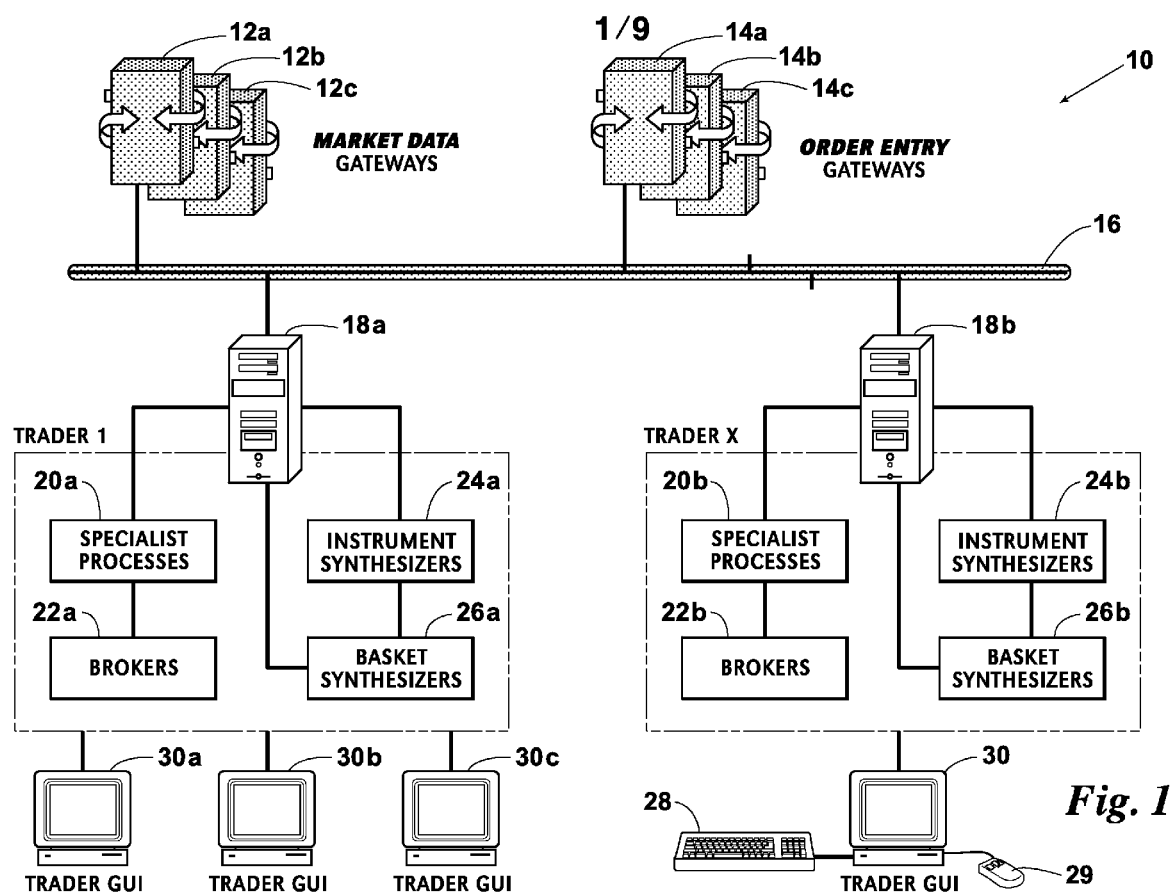
FIG. 1 is a diagrammatic illustration of a system suitable for facilitating trading of financial instruments according to the invention.

Turning now to the drawings wherein like reference characters indicate like or similar parts throughout, FIG. 1 illustrates a system 10 suitable for facilitating improved trading of financial instruments, including stocks, bonds, currency, futures, options, commodities and correlations and aggregations thereof. The system 10 is configured to enable a user to submit orders in less time, and thus to have orders filled at more desirable prices. In addition to enhancing speed and accuracy of trade order execution, the system 10 described herein also focuses on the objective of amalgamating all data used as input for a trade decision on the same user interface/screen used to accelerate order execution. This is accomplished by programming one or more computer readable mediums within the system 10, such as computer readable mediums (such as hard drives) of servers 18a and 18b, with software that provides the functions describe herein, including the function of displaying analytics and instrument data in a consolidated format that have a high level of correlation with the value of one or more other tradable instruments.

The system 10 is designed to interface with one or more electronic exchanges, electronic communication networks (ECNs) or brokers through market data (MD) gateways 12a-c that provide streaming market data for all traders using the system 10 and order entry (OE) gateways 14a-c that provide order routing and execution capabilities for all traders using the system 10. The MD gateways 12a-c include some basic filtering logic, such as logic for filtration of specific quote types, instruments, minimum quantity updates, maximum quotes per second (i.e., throughput), etc. OE gateways 14a-c include translation logic to map exchange specific protocols to an internally recognized protocol as well as to perform basic identification (ID) mapping from internal mnemonics to external mnemonics (i.e., internally recognized symbols and account numbers to externally recognized symbols and account numbers). Some basic error checking logic is also provided within both gateways 12a-c and 14a-c. The gateways 12a-c and 14a-c typically do not include business logic aimed at assisting traders in determining trade parameters (i.e., analytics are not provided by the gateways 12a-c and 14a-c).

Traders utilizing trader graphical user interfaces (GUIs) 30 and 30a-c access the exchanges, ECNs and brokers through the MD gateways 12a-c and the OE gateways 14a-c through servers 18a-b connected to a common network 16. FIG. 1 shows three traders using GUIs 30a-c. The GUIs 30, 30a-c are typically displayed on a computer screen, the content and interaction of which is controlled by user input devices such as a keyboard 28 and a mouse 29 with buttons and a scroll wheel. Each server 18a-b is programmed to listen for MD and executions of trade orders from the gateways 12a-c, 14a-c. Trade orders issued by a trader are communicated to the network 16 through the servers 18a-b. Trader-specific analytics and other pre-order processing are also performed by software residing on the trader's server 18a-b.

Other functions typically performed by servers 18a-b include housing the specialist processes 20a-b, brokers 22a-b, instrument synthesizers 24a-b, and basket synthesizers 26a-b. A specialist process 20a-b knows the intricacies of trading a particular instrument at a particular exchange. It converts exchange specific business logic (such as the calculation of unfilled order quantity) to a common format. It manages basic pre-trade risk and takes care of waiting for acknowledgments prior to submitting order modifications. Specialist processes 20a-b are the authority on traders' open orders. They perform self-crossing checks and enable a trader to avoid trading against himself in the open market. This is accomplished by internally transferring positions between sub-accounts within a given account when a trading decision is made, thus eliminating the need to send a live order to the marketplace. This feature is particularly advantageous when multiple trading strategies are deployed in an asynchronous fashion. The specialist processes 20a-b do not know anything about synthetic instruments 24a-b, baskets 26a-b, or trading strategies.

Each broker 22a-b acts as a bridge between a trader's GUI interface 30 and 30a-c and the specialist processes 20a-b, instrument synthesizers 24a-b, and basket synthesizers 26a-b. Brokers 22a-b interact with the instrument synthesizers 24a-b and basket synthesizers 26a-b to facilitate the conversions of synthetic orders into live orders that can be recognized by an exchange, ECN or broker. They perform the majority of the back end processing for the trader's GUI interface 30 and 30a-c, which allows a user to deploy his GUI interface 30 and 30a-c onto separate hardware for more efficient use of resources.

Instrument synthesizers 24a-b take in raw MD from the network 16 for a given instrument and modify the prices and quantities based on static and dynamic parameters which could come from analytics, static configurations, MD for other instruments, or other sources. The modified data is published on the internal network and is formatted in a similar fashion as real instrument market data (as opposed to synthetic). The underlying real data is typically attached to the synthetic MD stream for display purposes on the trader's GUI interface 30 and 30a-c. Instrument synthesizers 24a-b also provide on demand conversions between synthetic and real prices and quantities and vise versa. This is typically used by broker 22a-b and GUI 30, 30a-c. This on-demand conversion, commonly known as price and quantity normalization, may come in the form of something simple, such as a slope intercept formula (i.e., $Y=MX+B$), or in the form of something more complex, such a nonlinear conversion formula (i.e., a Black-Scholes model, a theoretical fair value model, an exponential equation, etc.). For example, if a user defines the price and quantity of two instruments to have a linear relationship, then the following formulas could be used for normalization:

| Instrument 1 Price | Instrument 1 Quantity |
|---|---|
| $Y1 = (M1 \times X1) + B1$ | $Y2 = (M2 \times X2) + B2$ |
| where, | where, |
| M1 = normalization price multiplier, | M2 = normalization quantity multiplier, |
| X1 = price of Instrument 2, and | X2 = quantity of Instrument 2, and |
| B1 = normalization price offset. | B2 = normalization quantity offset. |

Any of the normalization parameters (i.e., M1, B1, M2, B2) can be statically input, calculated by software process, or dynamically generated by a spreadsheet program. The same would hold true for complex industry standard formulas or user-defined non-linear formulas. The normalization parameters can be derived from a theoretically unlimited number of sources, including instrument prices, momentum values, economic assumptions, etc.

To accommodate complex synthesizer algorithms that generate floating point values that are not easily represented on a given tick, the Rapid Trader product employs intelligent price level rounding. Rapid Trader is able to perform rounding of such synthesized (normalized) values to the appropriate price level (tick) based on user-defined tick intervals. These user-defined tick intervals allow for the display of static price increments within the market depth representation. For example, if a user has specified a tick interval of 5 points per price level, a Sell order in the market that synthesizes to a value of 98.99 would be represented on the GUI market depth representation to the user as a price of 100 (since Sell orders round up and Buy orders round down). Conversely, a Buy order with a synthesized price of 99.23 would be represented in this scenario at a price level of 95. It is important to note that the same tick rounding logic will hold true for native (i.e., un-normalized) instruments that are represented with user-defined ticks. For example, if a native instrument normally ticks in 10 point increments, a user could define a 30 point tick interval, thus causing all quantity contained within each 3-tick price interval to be represented in a single tick (i.e., a multiple of 30) since two out of every three ticks will round into the third tick (once again, rounding up for asks and down for bids, respectively). This rounding functionality is especially critical to aggregated mode trading, where the GUI is specifically designed to add (aggregate) quantities at each price level within the market depth representation. When orders for multiple instruments are displayed within a single market depth representation, the likelihood of utilizing such rounding increases. For example, if Instrument X and Instrument Y are being traded in aggregate mode, and if the best bid for Instrument X is 97 (with a quantity of 4 in the market) and the best bid for Instrument Y is 98 (with a quantity of 6 in the market), the aggregated mode market depth representation would show a quantity of 10 at a price of 95 (assuming the previous 5 point user-defined tick interval).

Basket synthesizers 26a-b perform functions similar to the instrument synthesizer, but take multiple real and synthetic instruments as inputs. For example, a basket synthesizer may take in four Eurodollar outright future prices to synthetically create a butterfly or a condor spread that is viewable and tradable internally as a single/synthetic instrument. Another example is the conversion of multiple cash securities (such as the 500 stocks of the S&P 500) into a single tradable S&P 500 synthetic basket instrument. Conversely, basket synthesizers convert single user-generated orders into a multitude of real orders that are recognizable by an exchange, ECN or broker. The user may define algorithmic trading logic for determining order execution methodology for the multiple real orders.

Figure 5:
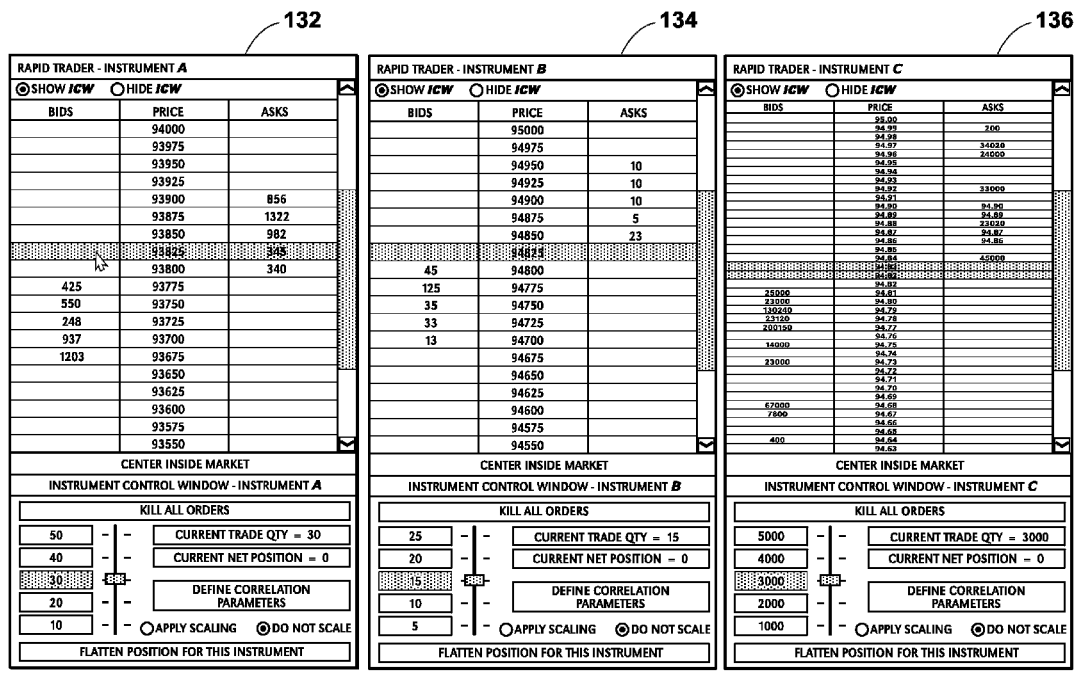
FIG. 5 shows a GUI for use in trading financial instruments in correlated mode according to the method of FIGS. 4A-B.

Each trader GUI 30, 30a-c displays real, synthetic and basket instruments within a vertically or horizontally oriented trader interface having a display of real-time, market depth representations of the tradable financial instruments, such as the display shown in FIG. 5. The display of data within the trader GUI 30, 30a-c may be derived from a single instrument (i.e., single instrument mode), a group of correlated instruments in aggregate format (i.e., aggregated mode), or from a single synthetic instrument whose price movement is linked to one or more correlated instruments within different trader GUIs 30, 30a-c (i.e., correlated mode).

With continued reference to FIG. 1, servers 18a, 18b are programmed with a specialized software program and methodology for enhancing electronic trading of financial instruments. In general, the program operates to decrease the amount of keystrokes or other user input effort required to place an electronic trade while increasing the ability of the trader to consistently submit accurate trade orders to an electronic exchange, ECN (electronic communications network) or broker. The program does this in one way by focusing on amalgamating data used as input for a trade decision on the same user interface/screen used to accelerate order execution. This is accomplished by providing a software program that functions to display analytics and instrument data in a consolidated format with a high level of correlation among the value of one or more other tradable instruments. The correlation among the values of such instruments may be either positive or negative, thus making the software program an advanced GUI-based "bundle" (i.e., one or more trade orders for one or more tradable financial instruments that are submitted to one or more electronic exchanges simultaneously) trading system. The trade order bundle may include only one tradable financial instrument (such as a stock or a commodity). Alternatively, the trade order bundle may include a plurality of aggregated tradable financial instruments. The individual orders within the trade order bundle may include one or more order types (such as limit, market, stop, etc.) as well as different market sides (i.e., Buy and Sell orders in the same bundle). Correlation is described herein as the establishment of a relationship between an instrument's price and/or quantity and another instrument's price and/or quantity. The method used to correlate one instrument to another is, in a sense, intelligent use of the normalization technique described within this document.

For example, referring to the above-given Instrument 1 price and Instrument 1 quantity slope intercept normalization formulas, a user could create a synthetic instrument utilizing said normalization formulas. If the user wishes to represent Instrument 1 in terms of Instrument 2, then the user would generate M1 and B1 values by any mathematical means that normalize the price of Instrument 1 to Instrument 2. Accordingly, the user would specify M2 and B2 values to normalize the quantity as well. Within this simple example, the user has specified a correlation of both price and quantity of Instrument 1 versus Instrument 2 (in other words, Instrument 1 would now be represented in terms of a mathematical relationship to Instrument 2). If the user has selected the appropriate M1, B1, M2, B2 values, the prices and quantities of the normalized Instrument 1 and the native/un-normalized Instrument 2 would likely be similar, thus increasing the value of correlated mode and aggregated mode trading.

The program utilizes graphical user interfaces (GUIs) that access the exchanges, ECNs and brokers through market data (MD) gateways (which provide streaming market data for electronic traders) and order entry (OE) gateways (which provide order routing and execution capabilities for electronic traders). Each trader GUI displays real, synthetic and/or basket instruments within a vertically or horizontally oriented trader interface having a display of real-time, market depth representations of the tradable financial instruments. The display of data within the trader GUI may be derived from a single instrument, a group of correlated instruments in aggregate format, or from a single synthetic instrument whose price movement is linked to one or more correlated instruments within different trader GUIs. Each of these modes of operation is further described below.

To accelerate speed of order entry, the program employs advanced pre-calculation technology to pre-construct hypothetical bundles of trades that may be submitted to an electronic exchange. Users are able to pre-set different user input device actions (such as clicking a mouse button, double-clicking a mouse button, or striking a key of a computer keyboard) that correspond to specific trade bundles prior to order submission. In a simplified embodiment of this concept, the single instrument mode, users will likely set the left and right mouse buttons (or other active elements of a user input device) to correspond to a single instrument bundle containing one Buy order for the left mouse button and a single instrument bundle containing one Sell order for the right mouse button. In such a configuration, the program may pre-construct all possible Buy and Sell orders for all valid price levels accepted by the electronic exchange(s). At a minimum, the program will pre-calculate the hypothetical Buy and Sell order at the currently selected price level to decrease the calculation load on the system, as pre-calculation of all possible orders may create an undue burden on the system when prices are rapidly fluctuating. It should be noted that, even in single instrument mode, users may specify different user input device actions (such as a third or fourth mouse button) that are associated with additional single instrument bundles that differ from the above-described Buy and Sell order bundles. In such a case, the program will pre-construct even more hypothetical orders such that upon action of any of the different user input device options, the payload of the trade orders does not have to be subsequently created.

The advantages of the above-described pre-construction technology are magnified in aggregated and correlated mode, where the hypothetical trade bundles may contain more than one message. In these modes, if such pre-construction were not performed, there would be a significant amount of calculation performed after a user takes final action with a user input device to submit a trade order. For example, if the user is viewing a vertically-oriented display of synthetic prices that contains 20 price levels, the program may pre-construct all hypothetical bundle trades that could occur for all 20 price levels for each pre-set user input option. Thus, if a user has pre-set a two-button mouse to send Buy bundles with the left mouse button and Sell bundles with the right mouse button, the program may pre-construct 20 times 2 (40) or more hypothetical bundles of trade orders. The program will calculate more than 40 if configured to not only pre-construct based on all price levels that are visible to the user, but also all hypothetical price levels that could be accepted by the exchanges. At a minimum, in such a situation, the program will pre-construct a hypothetical Buy bundle and a hypothetical Sell bundle for the price level that is currently selected by the user.

In a preferred embodiment, the user is provided with an indicator of the selected price level (described herein as "highlighting"). Highlighting of a desired price level can be accomplished in any manner that operates to provide a feedback indicator to the user that a price level has been selected for further consideration. Suitable methods for highlighting the price level include changing the font type, size or color of the highlighted price level to a font type, size or color that is different than all other displayed price levels. Another way to indicate/highlight the selected price level to the user is to place an icon (such an arrow, smiley face, or other iconic symbol) adjacent to the selected price level. Yet another way to indicate the selected price level to the user is to place a highlighted box or other geometrically shaped area around or adjacent to the selected price level. The price level indicator serves the purpose of giving the user confidence that the desired price level is the one that he has been selected or in the case of correlated mode, it gives the user confidence of the correlated value of one instrument price value versus another instrument's price value without the need for additional external calculations). However, it will be understood that highlighting of a price level is not required for a user to select a price level.

For example, when the user moves an input device pointer in a rapid manner along the market depth representation and takes subsequent further user input device action prior to the visual indicator being displayed at the selected price level (i.e., where the price level highlighting cannot catch up with the user input device pointer), the user is still selecting the price level that corresponds to the user input device and not the lagging indicator at a different price level that is highlighted. Another example is where a user has a capability to take different user input actions, each of which may correspond to a different price level in the market depth representation. A preferred embodiment of this is a GUI device having user input devices, such as buttons or keys, at each price level on either side of the GUI 30, 30*a-c*. The buttons are stacked vertically and each row of buttons or other user input devices corresponds to a Buy action and a Sell action at the respective price levels. Using such an input device, the user would take only one user input action to submit an order and highlighting would not be necessary. In addition, pre-construction of all order bundles would likely take place for all price levels within the market depth representation since pre-selection of a price level would not occur.

Perhaps the most important aspect of this new technology in all three modes is that all of the trade order parameters are pre-set prior to the user taking final action with a user input device to submit the trade order to one or more electronic exchanges. This is true even if external analytics or market data modifies synthetic relationships that are defined in correlated or aggregated mode since the software will automatically perform the hypothetical pre-construction step for the hypothetical trade bundles upon receipt of said new market data. Thus, there is no situation in which the program will set trade order parameters following final action to submit the trade order(s) by the user. Instead, users select bundles of orders represented at different locations on the order entry display based on selection of different user input options.

When trading in aggregated or correlated modes, trades are submitted either via pre-specified best execution algorithms or user-defined best execution algorithms. This allows for the most advantageous set and/or sequence of orders to be sent to the one or more relevant exchanges. As a basic example, assume that two instruments (Instrument 1 and Instrument 2) have Sell orders resting in the market with post-normalization price values that equal "98" and "99", respectfully. Also assume that the user-defined tick interval is 10 points. Each of these orders would be displayed on the GUI 30, 30*a-c* at a price of 100 points (since Sell orders between ticks generally round up to the next tick increment). An exemplary best execution algorithm could be programmed to understand the sub-tick value of the prices, thus executing Buy orders against the "98" price prior to any execution against the "99" price.

To further illustrate, now assume that a user has specified a trade cost assumption for Instrument 1 of 3 points. An updated best execution algorithm would then execute Buy orders against Instrument 2 prior to trading against Instrument 1 since 98 plus 3 equals 101 (98+3=101) is more than 99. To take this example another step, assume that Instrument 2 has a trade cost assumption of 2 points. Additionally, assume that Instrument 1 is given a user priority of "1" and Instrument 2 is given a user priority of "2" (with lower numbers indicating higher priority). In such an example, 98 plus 3 equals 101 (98+3=101) is equal to 99 plus 2 equals 101 (99+2=101), thus deferring the execution decision to the user priority values. Given Instrument 1 has higher priority, this exemplary best execution algorithm would execute Buy orders against Instrument 1 prior to executing trade orders against Instrument 2.

It will be understood that the above examples are basic in nature and that more advanced best execution algorithms may be employed as well.

Single Instrument Mode

Figure 2A:
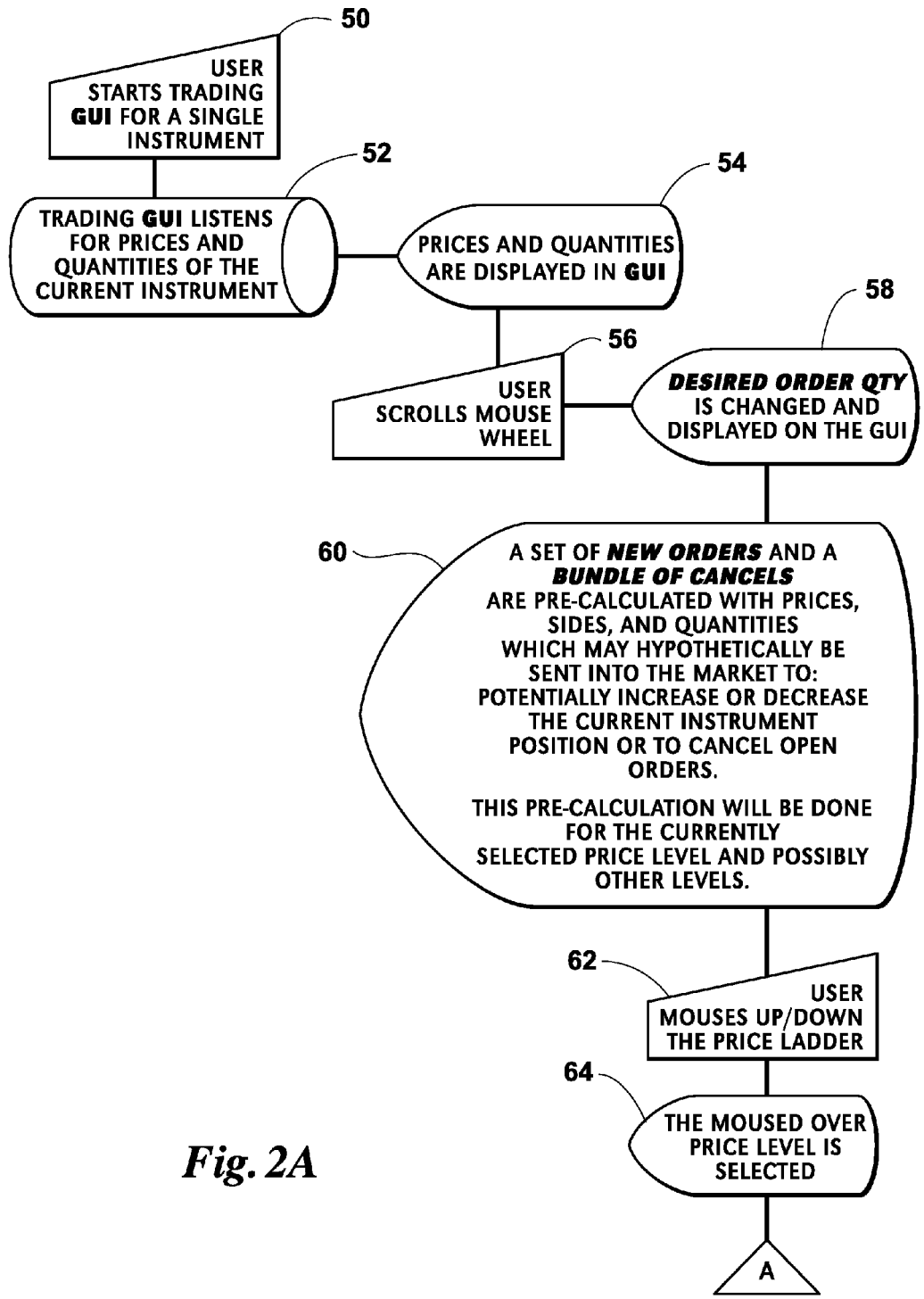
FIGS. 2A-B are a flow diagram for a method of electronic trading of a single financial instrument according to the invention.
Figure 2B:
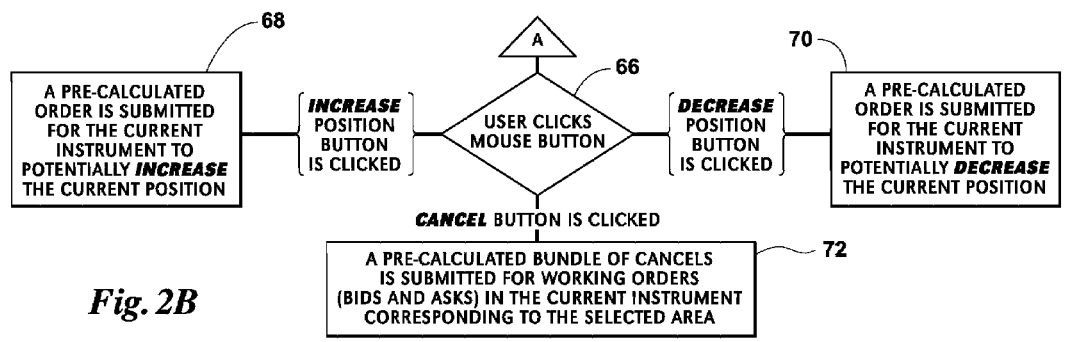
Figure 3:
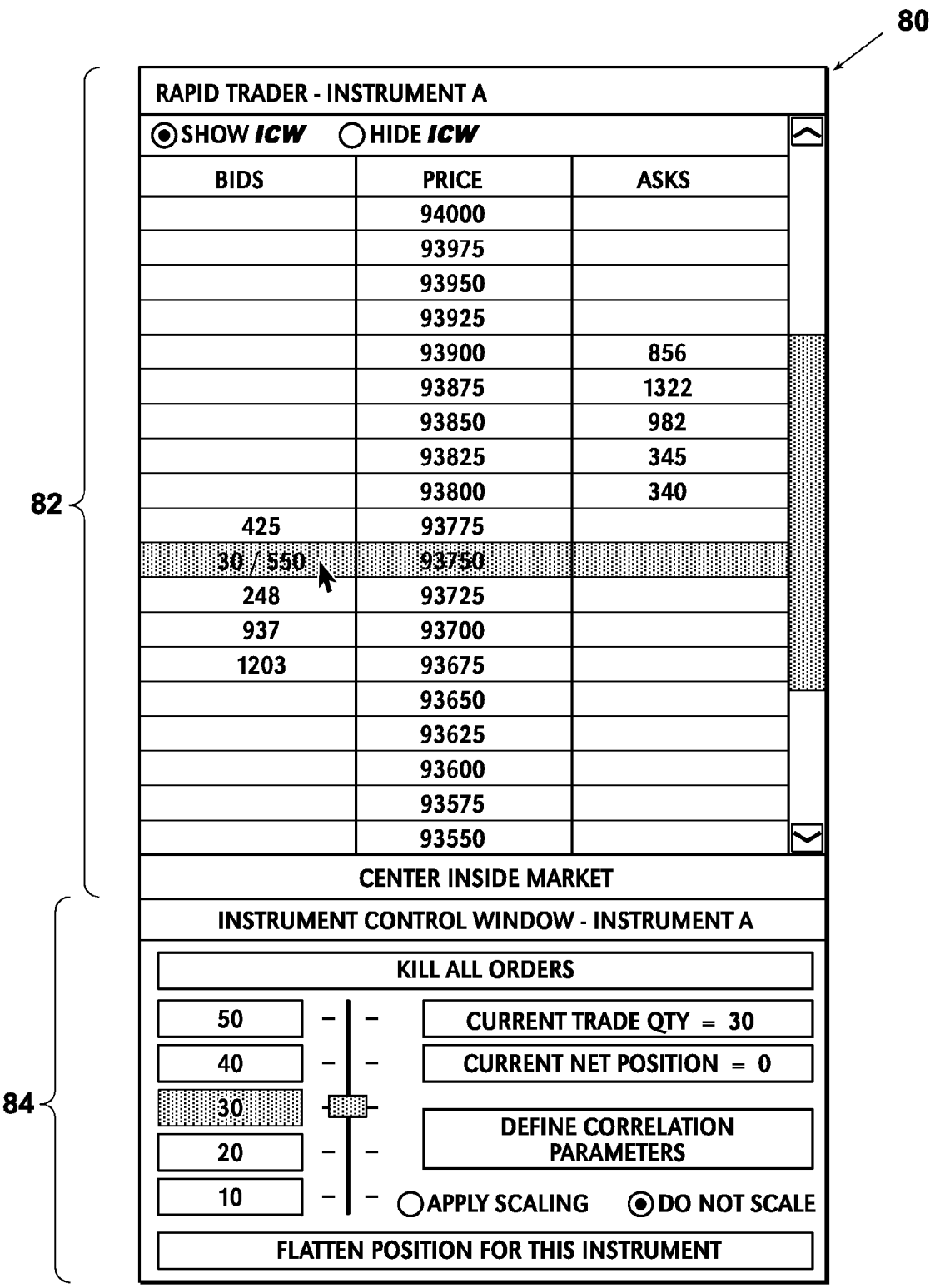
FIG. 3 shows a graphical user interface (GUI) for use in trading a single financial instrument in single instrument mode according to the method of FIGS. 2A-B.

FIGS. 2A and 2B provide a functional flow diagram for displaying and trading a single instrument in single instrument mode within the trader GUI 30 and 30*a-c*. The process is initiated when the user starts a trading GUI 30, 30*a-c* for a single instrument 50. FIG. 3 illustrates an exemplary GUI 80 for single instrument mode. The GUI 80 includes a market depth representation portion 82 with market price levels shown along a price axis (which may either remain static in response to changes in the inside market or dynamically change in response to changes in the inside market) and showing current market conditions as they relate to price, pending Bids in a Bid area and pending Asks in an Ask area, and a control window portion 84 showing current order parameters. The trading GUI 80 listens for prices and quantities of the current instrument 52 which are displayed on the GUI 54. To speed the selection of a desired quantity, the user may scroll the mouse wheel 56 until the desired quantity is displayed on the GUI 58. Referring to FIG. 3, the user has moused-over (i.e., positioned an on-screen pointer controlled by a computer mouse or other user input device) a price level of 93750, which selects that price level, and has indicated that he wishes to trade 30 units of the instrument. To change the selected price level, the user mouses up or down the displayed market depth representation 62 and the moused-over price level, representing the price level at which the user wishes to initiate a trade, is selected 64. Assuming a user has defined three user input options, including (1) a Buy order bundle option associated with the left mouse button containing one hypothetical Buy order per price level, (2) a Sell order bundle option associated with the right mouse button containing one hypothetical Sell order per price level, and (3) a cancellation bundle containing one or more hypothetical cancellation orders per price level, either prior to selecting or upon selecting of a price level, all of the order parameters of the hypothetical Buy bundles and the hypothetical Sell bundles associated with at least the selected price level are set so that the only action taken when the user initiates one of the input options is to submit the desired bundle to an electronic exchange 60. Consistent with the above assumptions, after a price level is highlighted or otherwise selected through action of a user input device, the user then clicks a mouse button 66 or takes some further action with a user input device to place an order. If the user wishes to submit a Buy (Bid) order, the Buy button is clicked and a Bid is submitted for the current instrument with the desired quantity at the selected price level 68. If the user wishes to submit a Sell (Ask) order, the Sell button is clicked and an Ask is submitted for the current instrument with the desired quantity at the selected price 70. The Buy and Sell buttons as previously stated are preferably left and right mouse button, respectively. However, it will be understood that actions taken with other active elements of a user input device may be employed in lieu of left and right mouse buttons. If the user wishes to cancel an order that has been submitted and is working, the user clicks a cancel button (such as the middle mouse button) and the cancel is submitted for all working orders, including Bids and Asks, in the current instrument at the selected price 72.

By utilizing differing single actions of a user input device, such as a computer mouse with buttons and scroll wheel, to select pre-constructed order parameters (Buy v. Sell), speed of order entry, and more importantly accuracy of order entry, is increased significantly. Thus, when moving the user input device, the trader need only focus on the movement of the user input device in parallel with the display of market depth since perpendicular movements have no bearing on the trade action. This enhances the ability of the user to consistently and accurately submit orders without the need to concentrate on Bid and Ask order entry regions, which are often missed by the trader in fast markets.

Speed of order entry is also enhanced by configuring the software to pre-construct trade parameters either prior to or at the time the user mouses over the desired price level (for Buy orders, Sell orders, and any applicable cancellation orders at that price level) so that the only action taken when a user input option is initiated is to submit the pre-constructed Buy bundle, Sell bundle or cancellation bundle. At the session level and network level, some additional information may be attached to the message/packet generated by the program. This information may include unique identifiers and sequence numbers. The user has no control over the attachment of such information, which is not a trade parameter(s).

Correlated Mode

Figure 4B:
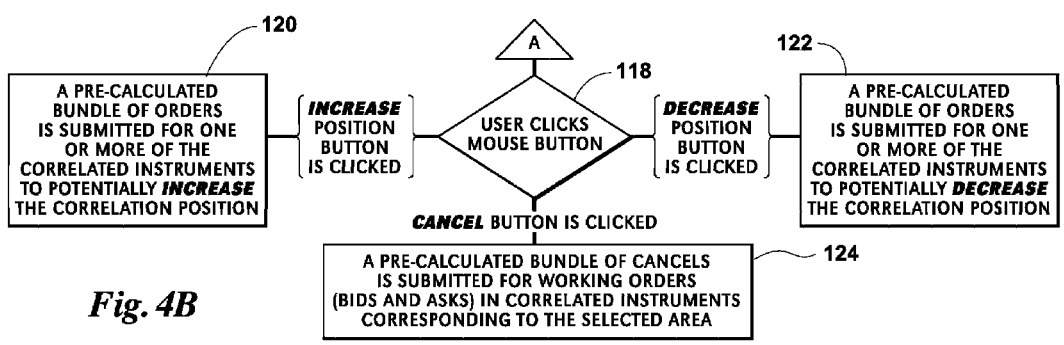
FIGS. 4A-B are a flow diagram for a method of electronic trading of one or more correlated financial instruments in correlated mode according to the invention.
Figure 4A:
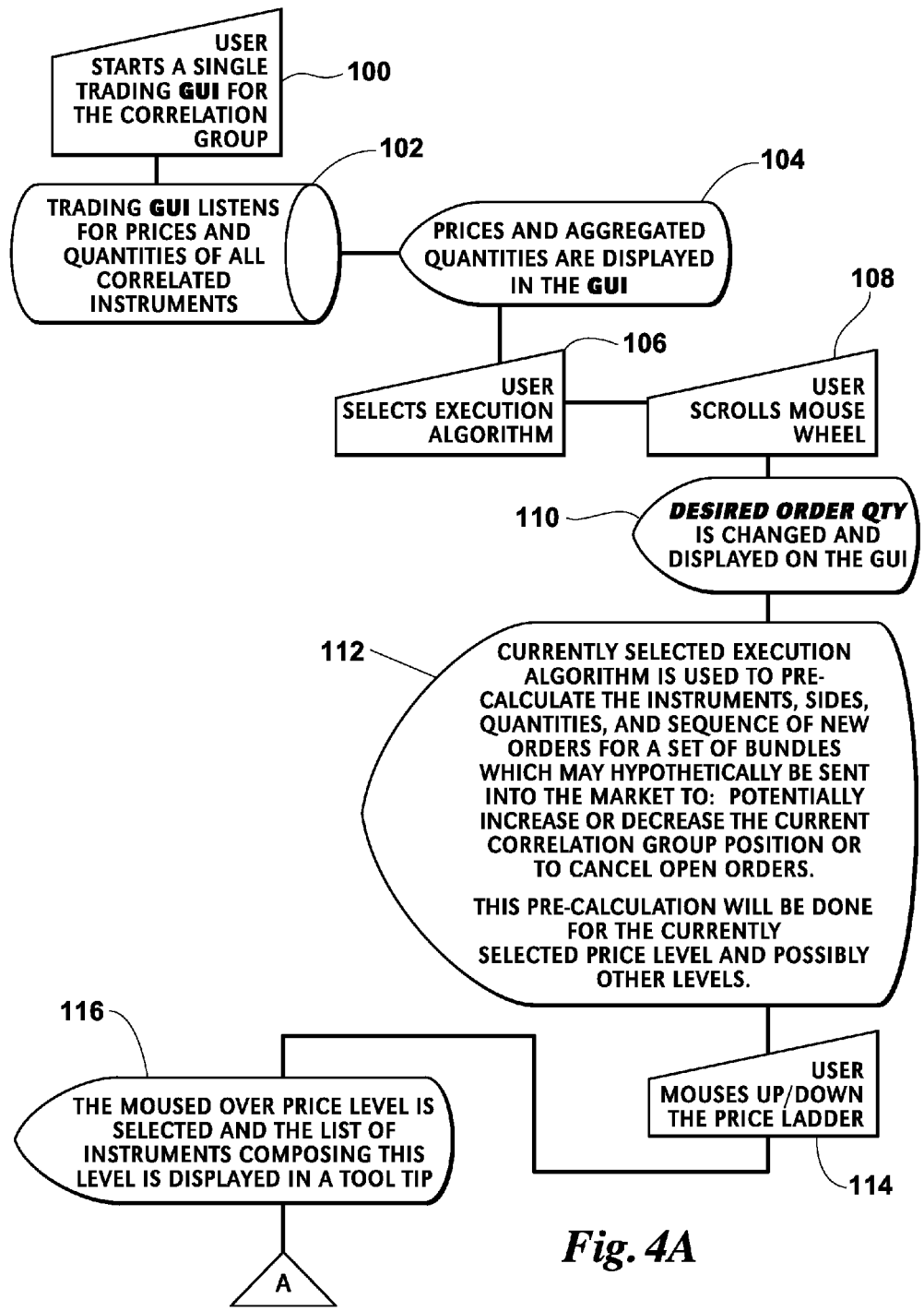

FIGS. 4A and 4B provide a functional flow diagram for displaying and trading a group of correlated instruments in correlated mode within the trader GUI 30 and 30*a-c*. The process is initiated when the user starts a trading GUI for each correlated instrument 100. FIG. 5 illustrates an exemplary set of GUIs 132, 134 and 136 configured for correlated mode trading. Each GUI 132, 134, 136 shown in FIG. 5 displays a market depth representation showing market price levels for a single synthetic instrument, each of which is part of a common correlation group. Each trading GUI 132, 134, 136 listens for prices and quantities for each synthetic instrument 102, which are displayed on the respective GUIs 104. The user defines an execution algorithm or selects a pre-defined execution algorithm for the trade 106. To speed the selection of a desired quantity, the user may scroll the mouse wheel 108 until the desired quantity is displayed on the GUI 110, which will be reflected in GUIs 132, 134, 136. Referring to FIG. 5, the user has moused over, (i.e., positioned an on-screen pointer controlled by a computer mouse or other user input device) at a price level of 93825 for instrument 132, which highlights and selects that price level for instrument 132 as well as correlated price levels of 94825 for instrument 134 and 94.83/94.82 for instrument 136. To change the selected price level, the user mouses up or down the displayed market depth representation of any instrument 114 and the moused-over price level, representing the price level at which the user wishes to initiate a trade, is selected as well as correlated price levels in all other displayed instruments 116 within trading GUIs 132, 134 and 135. Assuming a user has defined three user input options, including (1) a Buy order bundle option associated with the left mouse button containing one or more hypothetical Buy orders per price level, (2) a Sell order bundle option associated with the right mouse button containing one or more hypothetical Sell orders per price level, and (3) a cancellation bundle containing one or more hypothetical cancellation orders per price level, either prior to selecting or upon selecting of a price level, all of the order parameters of the hypothetical Buy bundles and the hypothetical Sell bundles associated with at least the selected price level are set so that the only action taken when the user initiates one of the input options is to submit the desired bundle to an electronic exchange 112. Consistent with the above assumptions, either prior to or upon selection of a price level (i.e., "highlighting"), all of the parameters of a set of hypothetical Buy orders and a set of hypothetical Sell orders are set (based on the user's execution algorithm or other pre-defined execution algorithm) so that the only action taken when a user input option is initiated is to determine which pre-constructed hypothetical set of Buy or Sell or cancellation orders is submitted to the electronic exchange 112. After a price level is highlighted or otherwise selected (such as by positioning a pointer of a user input device at a desired price level), the user then clicks a mouse button 118 to place the order bundle. If the user wishes to submit a Buy (Bid) order bundle, the Buy button is clicked and a user-defined best execution algorithm (or other pre-defined execution algorithm) is used to determine the instruments, quantities, and sequence of new orders 120. One or more Bids are then submitted for one or more of the correlated instruments based on a user-defined execution algorithm, for the desired quantity at the selected price 120. If the user wishes to submit a Sell (Ask) order bundle, the Sell button is clicked and a user-defined best execution algorithm is used to determine the instruments, quantities and sequence of new orders 122. One or more Ask orders are then submitted for one or more of the correlated instruments based on a user-defined execution algorithm for the desired quantity at the selected price 122. The Buy and Sell buttons are preferably left and right mouse buttons, respectively. If the user wishes to cancel an order that has been submitted and is working, the user clicks a cancel button (such as the middle mouse button) and the cancel is submitted for all working orders, including Bids and Asks, in all correlated instruments at the selected price 124.

By utilizing differing single actions of a user input device, such as a computer mouse with buttons and scroll wheel, to select pre-constructed order parameters (Buy v. Sell), speed of order entry, and more importantly accuracy of order entry, is increased significantly. Thus, when moving a pointer of the user input device, the trader need only focus on the movement of the user input device pointer in parallel with the display of market depth since perpendicular movements have no bearing on the trade action. This enhances the ability of the user to consistently and accurately submit orders without the need to concentrate on Bid and Ask order entry regions, which are often missed by the trader in fast markets.

Speed of order entry is also enhanced by configuring the software to pre-construct trade parameters either prior to or at the time the user mouses over the desired price level (for Buy orders, Sell orders, and any applicable cancellation orders at that price level) so that the only the action taken when a user input option is initiated is to submit the pre-constructed Buy bundle, Sell bundle or cancellation bundle. At the session level and network level, some additional information may be attached to the message/packet generated by the Rapid Trader product. This information may include unique identifiers and sequence numbers. The user has no control over the attachment of such information, which is not a trade parameter(s).

One advantage of correlated mode is that it gives the trader a complete view of the market not only for a single instrument being traded on one exchange or multiple exchanges, but also for statistically similar instruments traded on one or more exchanges, thus eliminating statistical arbitrage opportunities for the trader's competition. In addition, if the trader wants to trade a single instrument within the correlation group, the trader can override the correlation group execution algorithm and trade that instrument specifically via a different action of a user input device (such as holding down the control key of a computer keyboard during the mouse click).

Aggregated Mode

Figure 6A:
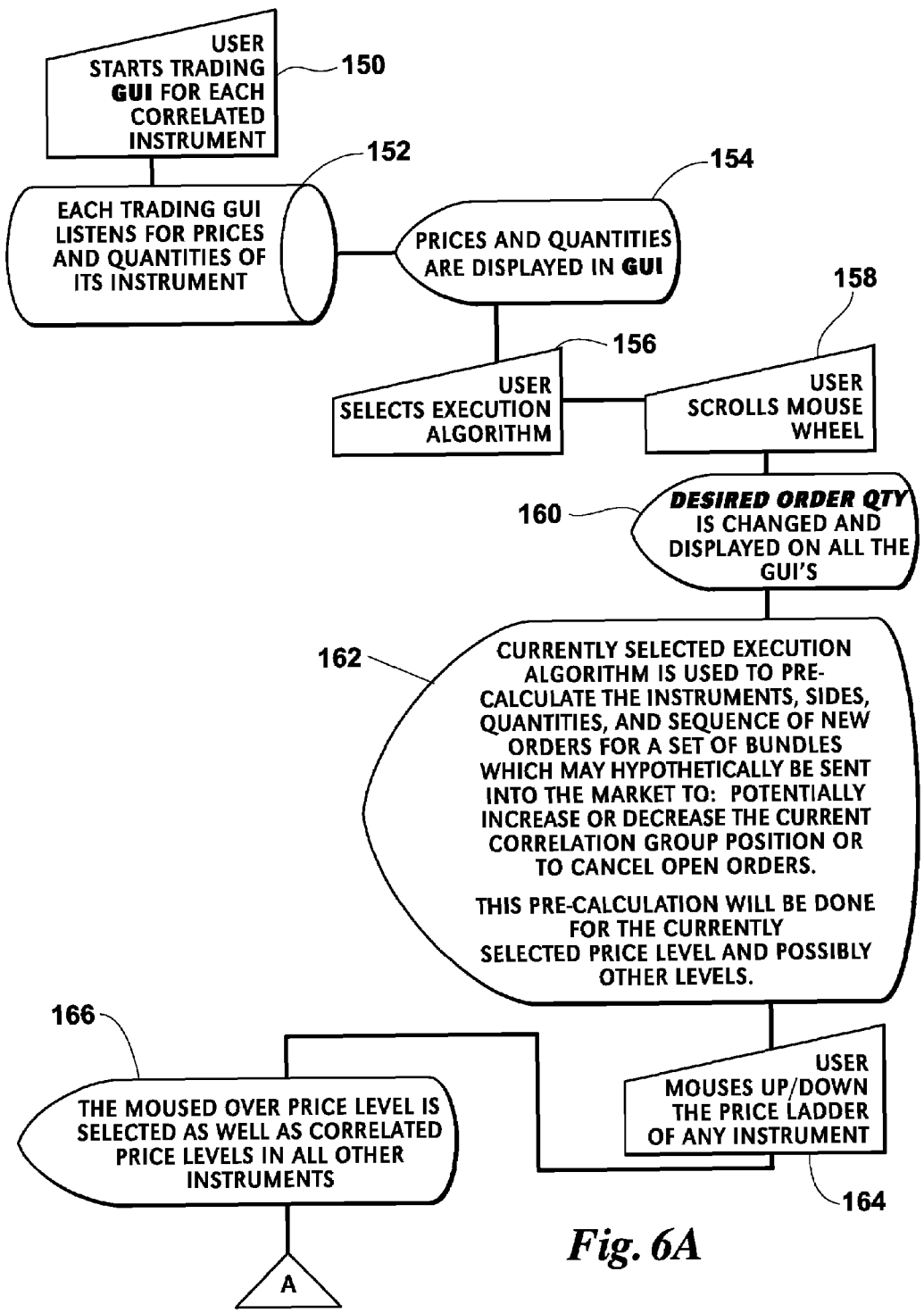
FIGS. 6A-B are a flow diagram for a method of electronic trading of one or more correlated financial instruments in aggregated mode according to the invention.
Figure 6B:
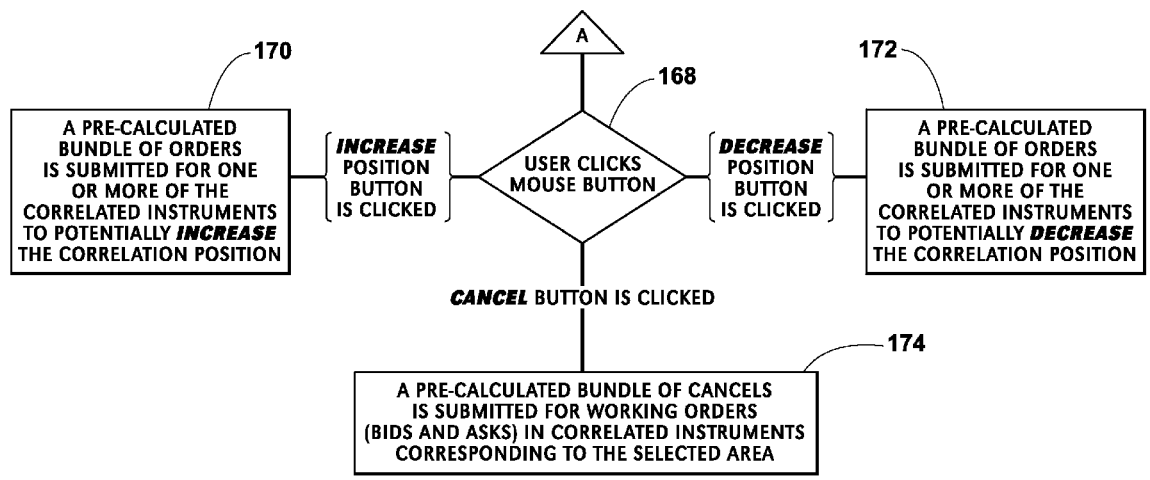
Figure 7:
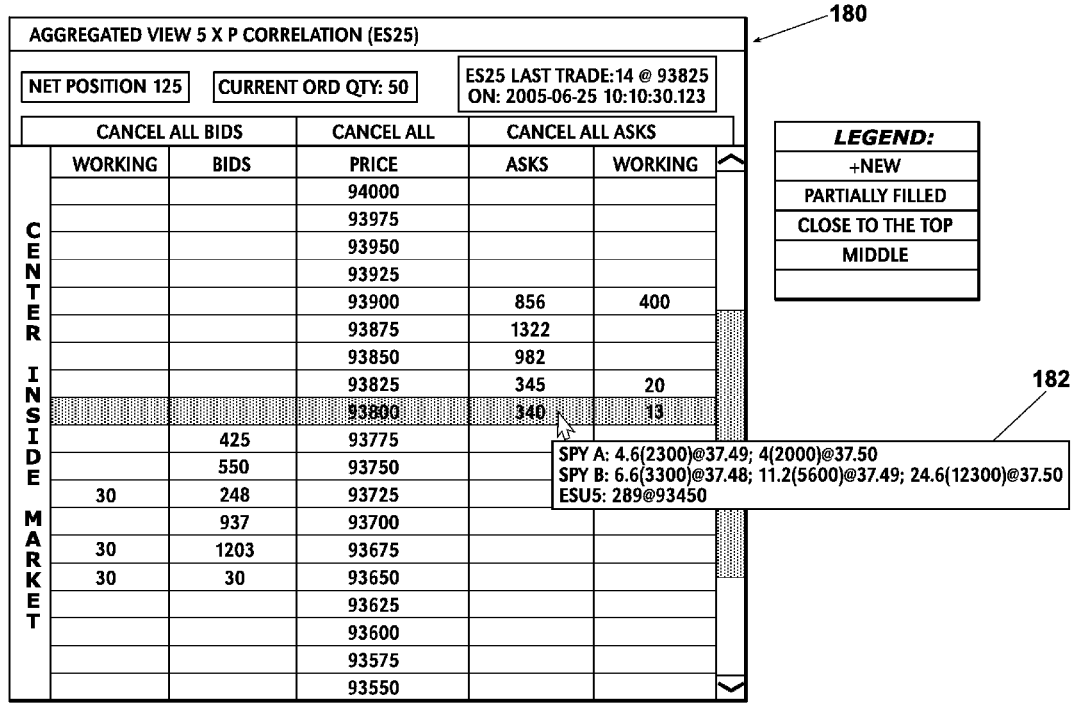
FIG. 7 shows a GUI for use in trading financial instruments in aggregated mode according to the method of FIGS. 6A-B.

FIGS. 6A and 6B provide a functional flow diagram for displaying and trading an aggregated group of correlated instruments in aggregated mode within the trader GUI 30 and 30a-c. The process is initiated when the user starts a single trading GUI for the correlation group 150. FIG. 7 illustrates an exemplary GUI 180 for aggregated mode. The trading GUI 180 listens for prices and quantities for all correlated instruments 152 which are displayed on the GUI 154. The user defines an execution algorithm or selects a pre-defined execution algorithm for the trade 156. To speed the selection of a desired quantity, the user may scroll the mouse wheel 158 until the desired quantity is displayed on the GUI 160. Referring to FIG. C-3, the user has moused-over (i.e., positioned an on-screen pointer controlled by a computer mouse or other user input device) a price level of 93800, which highlights and selects that price level. To change the selected price level, the user mouses up or down the displayed market depth representation 164 and the moused-over price level, representing the price level at which the user wishes to initiate a trade, is selected and the list of instruments comprising this level is displayed in a tool tip 182. (See block 166 of FIG. 6A) Assuming a user has defined three user input options, including (1) a Buy order bundle option associated with the left mouse button containing one or more hypothetical Buy orders per price level, (2) a Sell order bundle option associated with the right mouse button containing one or more hypothetical Sell orders per price level, and (3) a cancellation bundle containing one or more hypothetical cancellation orders per price level, either prior to selecting or upon selecting of a price level, all of the order parameters of the hypothetical Buy bundles and the hypothetical Sell bundles associated with at least the selected price level are set so that the only action taken when the user initiates one of the input options is to submit the desired bundle to the one or more electronic exchanges 162. Consistent with the above assumptions, either prior to or upon selection of a price level (i.e., "highlighting"), all of the parameters of a set of hypothetical Buy orders and a set of hypothetical Sell orders are set (based on the user's execution algorithm) so that the only action taken when a user input option is initiated is to determine which pre-constructed hypothetical set of Buy or Sell or cancellation orders is submitted to the electronic exchange 162. After a price level is selected, the user then clicks a mouse button 168 to place an order. If the user wishes to submit a Buy (Bid) order bundle, the Buy button is clicked and a user-defined best execution algorithm is used to determine the instruments, quantities, and sequence of new orders 170. One or more orders are then submitted for one or more of the correlated instruments based on a user-defined execution algorithm, for the desired quantity at the selected price 170. If the user wishes to submit a Sell (Ask) order bundle, the Sell button is clicked and a user-defined best execution algorithm is used to determine the instruments, quantities and sequence of new orders 172. One or more Ask orders are then submitted for one or more of the correlated instruments based on a user-defined execution algorithm for the desired quantity at the selected price 172. The Buy and Sell buttons are preferably left and right mouse buttons, respectively. If the user wishes to cancel an order that has been submitted and is working, the user clicks a cancel button (such as the middle mouse button) and the cancel is submitted for all working orders, including Bids and Asks, in all correlated instruments at the selected price 174.

One advantage of aggregated mode is that it gives the trader a complete view of the market not only for a single instrument being traded on one exchange or multiple exchanges, but also for statistically similar instruments traded on one or more exchanges, thus eliminating statistical arbitrage opportunities for the trader's competition. Another advantage of aggregated mode is that it consolidates the price discovery process for ultra-high Beta (a statistical correlation factor) instruments within a single GUI.

By utilizing differing single actions of a user input device, such as a computer mouse with buttons and scroll wheel, to select pre-constructed order parameters (Buy v. Sell), speed of order entry, and more importantly accuracy of order entry, is increased significantly. Thus, when moving the user input device, the trader need only focus on the movement of the user input device in parallel with the display of market depth since perpendicular movements have no bearing on the trade action. This enhances the ability of the user to consistently and accurately submit orders without the need to concentrate on order entry regions, which are often missed by the trader in fast markets.

Speed of order entry is also enhanced by configuring the program to pre-construct trade parameters either prior to or at the time the user mouses over the desired price level (for Buy orders, Sell orders, and any applicable cancellation orders at that price level) so that the only the action taken when a user input option is initiated is to submit the pre-constructed Buy bundle, Sell bundle or cancellation bundle. At the session level and network level, some additional information may be attached to the message/packet generated by the Rapid Trader product. This information may include unique identifiers and sequence numbers. The user has no control over the attachment of such information, which is not a trade parameter(s).

The foregoing description details certain preferred embodiments of the present invention and describes the best mode contemplated. It will be appreciated, however, that changes may be made in the details of construction and the configuration of components without departing from the spirit and scope of the disclosure. Therefore, the description provided herein is to be considered exemplary, rather than limiting, and the true scope of the invention is that defined by the following claims and the full range of equivalency to which each element thereof is entitled.

What is claimed is:

1. A method implemented by a computer system for displaying information for use in placing a trade order bundle having trade order parameters for one or more financial instruments to be traded on one or more electronic exchanges, the method comprising:
   displaying on a graphical user interface screen of the computer system a first real time market depth representation of one or more tradable financial instruments, said first real time market depth representation having multiple price levels representing market prices for the one or more financial instruments represented by the first market depth representation;
   displaying on the graphical user interface screen a second real time market depth representation of one or more tradable financial instruments, said second real time market depth representation having multiple price levels representing market prices for the one or more financial instruments represented by the second market depth representation;
   defining by the computer system a correlation between price levels of the first and second real time market depth representations;
   selecting through action of a user input device of the computer system a market price level of the first market depth representation; and
   displaying on the graphical user interface screen an indicator of one or more correlated price levels on the second real time market depth representation.

2. The method of claim 1, wherein said correlated price levels are displayed based in part on a correlation algorithm.

3. The method of claim 1, further comprising sending the trade order bundle to said one or more electronic exchanges through further action of a user input device.

4. The method of claim 3, wherein said user input device includes a computer mouse with one or more mouse buttons, and said further action of the user input device includes clicking a mouse button.

5. The method of claim 3, wherein said user input device includes a computer mouse with one or more mouse buttons, and said further action of the user input device includes double-clicking a mouse button.

6. The method of claim 3, wherein said user input device includes a computer keyboard with keys, and said further action of the user input device includes striking a key on the computer keyboard.

7. The method of claim 3, wherein said step of sending further comprises:
   sending a buy order bundle by activating a first active element of the user input device; and
   sending a sell order bundle by activating a second active element of the user input device.

8. The method of claim 7 wherein said first active element includes the left button of a computer mouse and said second active element includes the right button of the computer mouse.

9. The method of claim 3, wherein one or more trade order parameters are pre-set according to a best execution algorithm prior to said further action of the user input device.

10. The method of claim 3, wherein all parameters of the trade order bundle are pre-set prior to said further action of the user input device.

11. The method of claim 3, wherein all parameters of the trade order bundle are pre-set prior to selection of the market price level.

12. The method of claim 3, wherein all parameters of the trade order are pre-constructed upon selection of the market price level.

13. The method of claim 1, wherein a market price level of the first market depth representation displayed on the graphical user interface screen is positively correlated to the second market depth representation.

14. The method of claim 1, wherein a market price level of the first market depth representation displayed on the graphical user interface screen is negatively correlated to the second market depth representation.

15. The method of claim 1, wherein a market price level of the first market depth representation displayed on the graphical user interface screen is linearly correlated to the second market depth representation.

16. The method of claim 1, wherein a market price level of the first market depth representation displayed on the graphical user interface screen is non-linearly correlated to the second market depth representation.

17. The method of claim 1, wherein said tradable financial instruments include stocks.

18. The method of claim 1, wherein said tradable financial instruments include commodities.

19. The method of claim 1, wherein each of said real time market depth representations comprises a price axis having a plurality of market prices for a financial instrument, a bid area having a plurality of displayed bid quantities each of which is associated with a market price level, and an ask area having a plurality of displayed ask quantities each of which is associated with a market price level.

20. The method of claim 19, wherein each of said market depth representations includes a static price interval that separates the display of quantities associated with the market price levels, wherein the static price interval may be defined by the user.

21. The method of claim 20, wherein bid quantities for one or more instruments having values that fall between the static market price levels are rounded down to the closest market price level.

22. The method of claim 20, wherein ask quantities for one or more instruments having values that fall between the static market price levels are rounded down to the closest market price level.

23. The method of claim 1, wherein said selecting step includes positioning an on-screen pointer of the user input device at said market price level.

24. The method of claim 23, wherein movement of the on-screen pointer along the market depth display changes the selected market price level.

25. The method of claim 1, wherein said indicator is displayed by changing the font color at the selected price level.

26. The method of claim 1, wherein said indicator is displayed by placing an icon adjacent the selected price level.

27. The method of claim 1, wherein said indicator is displayed by highlighting an area adjacent the selected price level.

28. A method implemented by a computer system for displaying information for use in placing a trade order bundle having trade order parameters for one or more financial instruments to be traded on one or more electronic exchanges, the method comprising:

displaying on a graphical user interface screen of the computer system a first real time market depth representation of one or more tradable financial instruments, said first real time market depth representation having multiple price levels representing market prices for the one or more financial instruments represented by the first market depth representation;

displaying on the graphical user interface screen a second real time market depth representation of one or more tradable financial instruments, said second real time market depth representation having multiple price levels representing market prices for the one or more financial instruments represented by the second market depth representation;

defining by the computer system a correlation between price levels of the first and second real time market depth representations;

selecting through action of a user input device of the computer system a market price level of the first market depth representation;

displaying on the graphical user interface screen an indicator of one or more correlated price levels on the second real time market depth representation; and sending the trade order bundle to said one or more electronic exchanges through further action of a user input device.

29. A method implemented by a computer system for displaying information for use in placing a trade order bundle having trade order parameters for one or more financial instruments to be traded on one or more electronic exchanges, the method comprising:

displaying on a graphical user interface screen of the computer system a first real time market depth representation of one or more tradable financial instruments, said first real time market depth representation having multiple price levels representing market prices for the one or more financial instruments represented by the first market depth representation;

displaying on the graphical user interface screen a second real time market depth representation of one or more tradable financial instruments, said second real time market depth representation having multiple price levels representing market prices for the one or more financial instruments represented by the second market depth representation;

defining by the computer system a correlation between price levels of the first and second real time market depth representations;

positioning an on-screen pointer of a user input device of the computer system at a market price level of the first market depth representation; and displaying on the graphical user interface screen an indicator of one or more correlated price levels on the second real time market depth representation.

\* \* \* \* \*